(12) United States Patent
Gross et al.

(10) Patent No.: US 6,682,705 B1
(45) Date of Patent: Jan. 27, 2004

(54) METHOD FOR CONDUCTING REACTIONS IN FLUIDIZED PARTICLE LAYERS

(75) Inventors: Gerhard Gross, Willich (DE); Guenter Lailach, Krefeld (DE); Dieter Wuelbeck, Krefeld (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/230,364

(22) PCT Filed: May 27, 1998

(86) PCT No.: PCT/EP98/03114

§ 371 (c)(1),
(2), (4) Date: Feb. 9, 2000

(87) PCT Pub. No.: WO98/53908

PCT Pub. Date: Dec. 3, 1998

(30) Foreign Application Priority Data

May 30, 1997 (DE) .......................... 197 22 570
May 28, 1997 (DE) .......................... 197 22 382

(51) Int. Cl.⁷ .............................. B01J 8/18; B01J 8/24; B05B 1/00; B05B 1/02

(52) U.S. Cl. .................. 422/139; 422/143; 241/39; 137/1; 239/602

(58) Field of Search .............................. 422/139, 140, 422/143, 145; 241/39; 137/1; 239/602

(56) References Cited

U.S. PATENT DOCUMENTS 3,377,350 A * 4/1968 Watson et al. .............. 544/201
5,061,457 A * 10/1991 Hsieh et al. ................ 422/140
5,732,893 A * 3/1998 Nied ........................... 241/39

* cited by examiner

Primary Examiner—Jerry D. Johnson
Assistant Examiner—Alexa A. Doroshenk
(74) Attorney, Agent, or Firm—Connolly Bove Lodge & Hutz

(57) ABSTRACT

The invention relates to a process for carrying out reactions in fluidized beds with transversal introduction of a reactant selected from oxygen or an oxygen-containing gas and a combustible reactant into a fluidized particle bed by transversal injection at supersonic speed by supersonic nozzles.

14 Claims, No Drawings

METHOD FOR CONDUCTING REACTIONS IN FLUIDIZED PARTICLE LAYERS

The invention relates to an apparatus and a process for carrying out reactions in fluidized particle beds, reactants being blown into the fluidized particle beds.

Reactions in fluidized particle beds are known, where these beds can be stationary beds in fluidized-bed reactors or streams of particles suspended in gas in reactors having a circulating fluidized bed, in which the particle stream discharged from the reactor is completely or partly separated from the gas stream and recirculated to the lower region of the reactor. The fluidized particles can be not only reactants, such as in roasting processes, coal combustion, chlorination processes etc. but also catalysts, such as in cracking processes, hydrogenation reactions etc., or inert material. In the multiplicity of the reactions carried out on an industrial scale in fluidized particle beds (FPB), in which the fluidizing medium is gaseous, the gas distributor plates through which the fluidizing gases are passed into the reactors frequently pose a problem, because they are exposed to both chemical and engineering effects. A further problem arises in the case of large reactors owing to the fact that the uniform gas distribution over large gas distributor plates is difficult and that high demands are made of the mechanical load-bearing capacity of the gas distributor plates on shutdown of operations. Finally, in the case of lateral particle feed, inadequate radial particle mixing can lead to zones having different reaction conditions within the FPB.

Particular problems with carrying out reactions in FPBs arise when two or more gaseous or liquid reactants are to be passed separately into an FPB, because, for example, they form explosive mixtures on mixing outside the FPB. If one or more of these reactants is passed through orifices in the reactor wall, problems arise owing to uneven distribution of the different reactants in the FPB. In order to avoid this, complicated apparatuses are used in which the various reactants are introduced through the gas distributor plates via separate feed lines.

The use of oxygen in stationary or circulating fluidized-bed reactors is known in the case of oxidizing reactions, such as, for example, the roasting of sulfidic ores, the thermal cleavage of waste sulfuric acids, the calcination of clay or the combustion of sewage sludges. By using air as fluidizing gas, the solid particles are fluidized, which means they are held in suspension, and simultaneously oxygen is fed together with the reactants for the oxidizing reactions. Fluidized particles can be oxidizable reactants, inert substances or catalysts.

In addition, it is known to increase the capacity of apparatuses and, in the case of exothermic reactions, such as the cleavage of waste sulfuric acid, to reduce the fuel requirement, by using oxygen or oxygen-enriched air instead of combustion air. If the fuels are burnt using burners (DE 2 506 438), this procedure is unproblematic. The use of oxygen-enriched air also brings advantages when such reactions are carried out in fluidized-bed reactors (DE 3 328 708). However, in this case, relatively narrow limits are set for the oxygen content, on the one hand owing to the resistance of the materials in the region of the feed system for the fluidizing air and, on the other hand, by a temperature elevation in the immediate vicinity of the gas distributor plate owing to the oxygen enrichment. These lead to problems with regard to the mechanical strength and scaling of the plates.

It was therefore an object of the present invention to provide an apparatus and a process for carrying out reactions in fluidized particle beds using which the abovementioned problems, such as uneven distribution in the FPB, chemical and mechanical strength and load-bearing capacity of the gas distributor plates, uneven gas distribution and inadequate radial particle mixing and differing reaction conditions in the FPB can be avoided and using which operations can be carried out effectively and inexpensively.

This object was achieved by the reactor according to the invention and the process according to the invention.

Surprisingly, it has been found that the above-mentioned problems can be substantially or completely solved by transversal injection of reactants into the FPB at supersonic speed.

The invention relates to a reactor having a gas distributor plate through which a fluidizing gas is introduced into a particle bed situated above this gas distributor plate to produce a fluidized particle bed, in which one or more supersonic nozzles are arranged in the reactor wall above the gas distributor plate.

The reactors are reactors in which, by feeding fluidizing gas through a gas distributor plate, a fluidized particle bed is formed above this plate and in which reactants are injected into this fluidized particle bed at supersonic speed through transversal supersonic nozzles radially or at an angle to the radius.

The supersonic nozzles, also known as Laval nozzles, are, if required, preferably provided with a cooling jacket.

Supersonic nozzles (Laval nozzles) have found broad application in industry and are used for accelerating gas streams from subsonic speed to supersonic speed.

One or a multiplicity of supersonic nozzles can be mounted at the periphery of the reactor.

The nozzles can be arranged in one or more planes.

The distance between the nozzles and the gas distributor plate is preferably at least 100 mm, particularly preferably 250 to 600 mm.

The Laval nozzles are preferably installed in such a manner that they terminate at, or are recessed from, the reactor inner wall.

The inclination of the nozzles to the horizontal is preferably less than 20°, particularly preferably 0°.

The supersonic nozzles are preferably arranged radially or at an angle to the radius.

The dimensions of the narrowest cross section and of the outlet cross section of the Laval nozzles depend upon the amount to be injected, the temperature and the Mach number of the reactants exiting from the nozzle and the available pressure of the components.

The nozzles are designed in accordance with the formulae for Laval nozzles known to those skilled in the art.

The invention further relates to a process for carrying out reactions in fluidized particle beds by passing a fluidizing gas through a gas distributor plate to produce the fluidized particle bed and by passing transversally one or more reactants into the fluidized particle bed, which comprises passing in the reactants by transversal injection at supersonic speed through supersonic nozzles.

The exit velocity of the reactants from the supersonic nozzle(s) is preferably at least Mach 1, particularly preferably at least Mach 1.5. The exit velocity is particularly preferably less than Mach 3.

The injected reactants can be gaseous. If the reactants are liquid or solid, they are injected into the fluidized particle bed by a carrier gas. Different reactants can be injected by separate nozzles.

The reactants which can be fed into the FPB by transversal supersonic injection are preferably gases, such as $O_2$, $H_2$, $Cl_2$, hydrocarbons, steam and many others. However, liquids, such as fuel oil, atomized in a gas stream (carrier gas) or solids, such as coal dust, suspended in a gas stream can also be injected by the transversal supersonic nozzles.

The reactant injected can particularly preferably be pure oxygen or oxygen-enriched air, preferably containing at least 30% by volume of $O_2$.

According to the invention, apart from the oxygen, in addition, combustible reactants can be fed to the fluidized bed through separate nozzles by transversal injection at supersonic speed.

Blowing in oxygen and, if appropriate, combustible reactants transversally at supersonic speed increases the mixing energy in the fluidized particle bed and thus improves the radial heat and mass transport. This results in a uniform box-like temperature profile and a homogeneous mass distribution, which leads to a uniform product quality. The additional supply of oxygen makes possible a considerable increase in the throughput at a given inlet area, or a decrease in the inlet area when a new fluidized-bed reactor is built.

The process described of transversal supersonic injection of oxygen and, if appropriate, combustible reactants, may be used advantageously with all oxidation processes in fluidized beds, for example in the oxidizing roasting of sulfidic ores or the gasification of coal, in the thermal cracking of waste sulfuric acids, salts, pickling baths and caustic baths, in the calcination of alumina, the combustion of sewage sludges or wastes, in the recycling of waste foundry sands, in the regeneration of catalysts and in the cracking of hydrochloric acid. The process according to the invention in this case is not restricted to the processes which are listed above and are mentioned only by way of example.

The apparatus according to the invention and the process according to the invention offer advantages, particularly, if the fluidizing gas and a further reactant are not to come into contact with one another until in the FPB, as is the case, for example, with calcination processes. In this case, air is used for fluidizing and a fuel is burnt in the FPB. Hitherto, this process has required complicated gas distributor plates in order to introduce the air and the fuel separately through the gas distributor plates through a multiplicity of orifices/nozzles. The process according to the invention here then makes it possible to feed in fuel through relatively few transversal supersonic nozzles and to introduce the fluidizing air through a simple gas distributor plate having a small cross section, the operating temperature of the gas distributor plate being below that of the prior art. Feeding fuel into the FPB at ultrasonic speed produces an excellent radial mixing of fuel, fluidizing air and fluidized particles. By means of additional supersonic injection of oxygen, in addition, a considerable increase in capacity can be achieved for a given reactor.

Processes for which particular advantages are achieved—as described above—by transversal supersonic injection of fuels and, if appropriate, oxygen, which may be mentioned are, in addition to the calcination processes, for example, the oxidizing thermal treatment of ores, the deoiling of millscales and others, the combustion of sewage sludge or refuse, the partial or complete reduction of ores, the thermal cracking of metal chlorides or metal sulfates, the oxidizing roasting of sulfidic ores etc.

The process according to the invention and the reactor according to the invention also offer advantages in the preparation of chlorides of titanium, silicon, zirconium and other metals, in which the gas distributor plates are exposed to a particularly high chemical attack. The gas distributor plates may be kept relatively small, for example.

Advantageously, the invention may also be employed in the case of fluidized-bed heat-treatment furnaces, in which $N_2$ or carburizing agents such as natural gas, methanol or CO can be injected through the Laval nozzles.

Further processes in which the inventions have advantageous effects are cracking processes, hydrogenation reactions, processes for regenerating catalysts, in particular processes for burning off carbon deposits and others. The processes in which the reactors according to the invention and the process according to the invention offer advantages are listed by way of example, and the list is not restricted to these processes.

The invention is to be described in more detail with reference to the examples below.

COMPARISON EXAMPLE 1

A fluidized-bed reactor having a 4 m diameter in the region of the gas distributor plate (for example of the slotted-grid type) was used for the thermal cracking of metal sulfates which were produced as a filtercake containing 68% strength sulfuric acid as moisture. The cracking was performed at approximately 1000° C., pyrites and coke being used as reducing agent and fuel.

12.5 t/h of the abovementioned filtercake, 2 t/h of pyrites and 2.45 t/h of coke were fed into the reactor. 20,000 m³/h of air were introduced through the grid (gas distributor plate). 100 mm above the grid, a temperature of 980° C. was measured. 1100 mm above the grid, the temperature was 1060° C., and 1070° C. in the gas outlet duct. The $SO_2$ content of the gases exiting from the reactor was 11.2% by volume (based on dry gas).

COMPARISON EXAMPLE 2

A fluidized-bed reactor having a 4 m diameter in the region of the gas distributor plate (for example of the slotted-grid type) was used for the thermal cracking of metal sulfates which were produced as a filtercake containing 68% strength sulfuric acid as moisture. The cracking was performed at approximately 1000° C., pyrites and coke being used as reducing agent and fuel.

20 t/h of the abovementioned filtercake, 3.3 t/h of pyrites and 3 t/h of coke were fed into the reactor. 18,000 m³/h (at the standard state) of air and 1900 m³/h of $O_2$ (corresponding to 28.1% by volume of $O_2$ in the fluidizing gas) were introduced through the grid (gas distributor plate). The required motor power of the fan by which the air/$O_2$ mixture was transported was 142 kW, and the inlet pressure upstream of the grid was 170 mbar. A temperature of 995° C. was measured at a distance of 100 mm above the grid. At a distance of 1100 mm above the grid, the temperature was 1060° C., and the temperature in the gas exit duct of the reactor was 1065° C.

Of the solid reaction products (metal oxide mixture+ash), approximately 85% were discharged as dust together with the reaction gases and approximately 15% were taken off from the reactor at the bottom as coarse sandy bed material. The reaction gas exiting from the reactor contained 18.3% by volume of $SO_2$ (based on dry gas).

COMPARISON EXAMPLE 3

On the reactor as described in Comparison Examples 1 and 2, evenly distributed about the periphery, 6 gas inlet ports were mounted, through which oxygen was introduced at a height of 350 mm above the grid. Oxygen was introduced through tubes of heat-resistant steel having an inner diameter of 24 mm which were mounted in such a way that they ended at the inner surface of the refractory lining of the reactor.

The filtercake, pyrites and coke solids were fed as in Comparison Examples 1 and 2. Only 18,100 m³/h of air were fed in through the grid. 1900 m³/h of O₂ were uniformly introduced through the 6 inlet tubes. The power consumption of the fan motor, at an inlet pressure of 155 mbar, was only 124 kW. The temperate at a height of 100 mm above the grid was only 920° C. The measurement points at a height of 1100 mm above the grid showed temperatures of 940 and 1135° C. The temperature in the gas exit duct was 1070° C.

After an experimental time of 2 h, coarse sintered pieces up to fist size were observed in the bed material. Since their content increased in the further course of the experiment, the experiment was terminated after 6 h. The dismounted gas inlet Lubes showed heavy scaling at their inner end.

EXAMPLE 1

Instead of the simple gas inlet tubes (as described in Comparison Example 3), Laval nozzles according to the invention were installed into the 6 ports in the reactor jacket, which nozzles were surrounded by a cooling jacket through which cooling water flowed. The nozzle end was recessed by 20 mm from the reactor wall.

In total 1900 m³/h of O₂ were introduced through the Laval nozzles (smallest diameter 10.2 mm) at an inlet pressure of 4.9 bar (absolute) and a reactor pressure of 1 bar absolute. The calculated exit velocity of the oxygen was Mach 1.7. The air flow rate and the operating data of the air fan corresponded to those of Comparison Example 2, the amounts of solids fed in corresponded to those of Comparison Examples 1 and 2. At a height of 100 mm above the grid, the temperature was 920° C. At all measurement points 1100 mm above the grid, temperatures of 1060 to 1065° C. were measured, and in the gas exit duct, the temperature was 1065° C.

The bed material taken off was uniformly sandy without sintered lumps. When the grid plate was inspected after an operating time of 8 months, it showed considerably less scaling than after a comparable operating period under the conventional operating conditions corresponding to Comparison Example 1. This ensured, also, in particular a uniform distribution of the fluidizing air during the entire operating period. This is important for the process, since in the event of poor distribution, metal sulfates can be discharged together with the metal oxide dust.

EXAMPLE 2

Only 16,000 m³/h of fluidizing air were introduced into the reactor (as described in Example 1) equipped with the Laval nozzles according to the invention. The O₂ pressure upstream of the Laval nozzles (smallest diameter 13.2 mm) was increased to 7.8 bar absolute, so that in total 4000 m³/h of O₂ were introduced. The calculated exit velocity from the nozzles was approximately Mach 2. The power requirement of the fan motor fell to 112 kW at 135 mbar inlet pressure. 28 t/h of filtercake, 4.5 t/h of pyrite and 4 t/h of coke could then be fed into the reactor. The temperature 100 mm above the grid increased to 940° C., the other temperatures were the same as in Example 1.

No sintering was observed in the bed material. The metal oxide mixture discharged as dust was homogeneous. The SO₂ content of the reaction gases was, at 25.0% by volume (based on dry gas), 6.7% by volume higher than in Example 1, which considerably facilitated further processing to sulfuric acid. In comparison with Example 1, the cracking performance was increased by 40% from 20 t/h to 28 t/h of filtercake. After an operating period of three months, the Laval nozzles showed no visible wear.

EXAMPLE 3

As in Example 1, 18,100 m³/h of fluidizing air were fed into the reactor. In a similar manner to Example 2, 4000 m³/h of O₂ were blown in through the Laval nozzles at an exit velocity of Mach 2. The feed of filtercake could be increased to 28.8 t/h. In addition, 6.2 t/h of pyrites and 4.1 t/h of coke were fed in. The SO₂ content in the reaction gases was 23.6% by volume (based on dry gas).

As a result of the O₂ feed according to the invention via Laval nozzles, an increase in the filtercake cracking capacity to 144%, versus Comparison Example 1, was thus possible.

What is claimed is:

1. A process for carrying out reactions in fluidized beds with transversal introduction of one or more reactants into the fluidized particle bed, wherein the reactants are introduced into the fluidized particle bed by transversal injection at supersonic speed by supersonic nozzles and the reactants being selected from the group consisting of oxygen, an oxygen-containing gas and a combustible reactant.

2. The process as claimed in claim 1, wherein the injected reactants are gaseous.

3. The process as claimed in claim 1, wherein the injected reactants are non-gaseous and are injected into the fluidized particle bed by a carrier gas.

4. The process as claimed in claim 1, wherein different reactants are injected through the nozzles.

5. The process as claimed in claim 1, wherein the reactant is oxygen-enriched air which has an oxygen content of at least 30% by volume.

6. The process as claimed in claim 1, wherein the particle bed is fluidized by a gas selected from the group consisting of air and oxygen-enriched air introduced through a gas distributor plate, and the oxygen content of the oxygen-enriched air being at most 30% by volume.

7. The process as claimed in claim 1, wherein fuels are introduced into the fluidized particle bed at supersonic speed through additional supersonic nozzles.

8. The process as claimed in claim 1, wherein the exit velocity is at least Mach 1.5.

9. The process as claimed in claim 8, wherein the injected reactants are gaseous.

10. The process as claimed in claim 8, wherein the injected reactants are non-gaseous and are injected into the fluidized particle bed by a carrier gas.

11. The process as claimed in claim 10, wherein different reactants are injected through the nozzles.

12. The process as claimed in claim 11, wherein the reactant is oxygen-enriched air which has an oxygen content of at least 30% by volume.

13. The process as claimed in claim 12, wherein the particle bed is fluidized by a gas selected from the group consisting of air and oxygen-enriched air introduced through a gas distributor plate, and the oxygen content of the oxygen-enriched air being at most 30% by volume.

14. The process as claimed in claim 13, wherein fuels are introduced into the fluidized particle bed at supersonic speed through additional supersonic nozzles.

* * * * *